United States Patent [19]

Ino et al.

[11] Patent Number: 5,240,890

[45] Date of Patent: Aug. 31, 1993

[54] METHOD OF MANUFACTURING HYDROCARBON CONVERSION CATALYST

[75] Inventors: Takashi Ino; Seigou Shibata, both of Yokohama, Japan

[73] Assignees: Nippon Oil Co., Ltd.; Petroleum Energy Center Foundation, Tokyo, Japan

[21] Appl. No.: 796,689

[22] Filed: Nov. 25, 1991

[30] Foreign Application Priority Data

Nov. 30, 1990 [JP] Japan .................................. 2-330142

[51] Int. Cl.$^5$ .......................... B01J 29/06; B01J 27/14
[52] U.S. Cl. ........................................ 502/64; 208/114
[58] Field of Search ........................... 502/64; 208/114

[56] References Cited

U.S. PATENT DOCUMENTS

| | | | |
|---|---|---|---|
| 4,179,358 | 12/1979 | Swift et al. | 208/114 |
| 4,483,764 | 11/1984 | Hensley, Jr. et al. | 208/114 |
| 4,567,152 | 1/1986 | Pine | 208/114 |
| 4,692,236 | 9/1987 | Sato et al. | 208/114 |
| 4,975,180 | 12/1990 | Eberly | 208/114 |

*Primary Examiner*—Carl F. Dees
*Attorney, Agent, or Firm*—Bucknam and Archer

[57] ABSTRACT

This invention provides a method of manufacturing a hydrocarbon conversion catalyst by spray-drying a slurry containing alumina-magnesia and a crystalline aluminosilicate zeolite, which is characterized in that the alumina-magnesia is treated with phosphoric acid containing solution before or after the slurry is subjected to a treatment of spray-drying.

13 Claims, No Drawings

METHOD OF MANUFACTURING HYDROCARBON CONVERSION CATALYST

BACKGROUND OF THE INVENTION

1. Field of the Invention

This invention relates to a method of manufacturing a hydrocarbon conversion catalyst, and in particular to a method of manufacturing a hydrocarbon conversion catalyst which will exhibit an excellent effect as a fluid catalytic cracking catalyst to be used in a process of catalytically cracking a heavy oil containing 0.5 ppm or more in total of heavy metals such as nickel and vanadium, iron and copper, in particular at least nickel and vanadium for obtaining light oils such as gasoline and kerosene.

2. Prior Art

Conventionally the catalytic cracking of petroleum hydrocarbon has been conducted by contacting it with a catalyst so as to crack the petroleum hydrocarbon to obtain a large amount of light components such as LPG and gasoline, and a small amount of cracked light oils. The catalyst thus used is deposited thereon with coke, which is subsequently removed by burning it in air for reuse. In this case, a distillate such as light gas oil (LGO) and heavy gas oil HGO obtained from an atmospheric distillation column, or vacuum gas oil (VGO) obtained from a vacuum distillation column is mainly employed as a feed stock.

However, with recent trends that crude oils to be produced in the world are heavier oils, and that heavy oil is increasingly oversupplied due to a change in the balance of supply and demand of oils in the industry, it is also necessary to use heavy oils containing distillation residue, as one of the feed stocks.

Meanwhile, heavy oils containing distillation residue contain extremely a large amount of metals such as nickel, vanadium, iron, copper and sodium as compared with a distillate. These metals are known to deposit on a catalyst thereby extremely inhibiting the cracking activity and selectivity of the catalyst.

Namely, with an increase in the amount of these metals depositing on the catalyst, the cracking ratio of the feed stock is gradually decreased to such extent that a desired cracking ratio can no longer be attained, while extremely increasing the generation of hydrogen and coke, thus making the operation of the apparatus more difficult, and at the same time reducing the yield of desired liquid products.

The present inventors have found in the past that a catalyst comprising crystalline aluminosilicate zeolite and alumina-magnesia matrix can be used as a catalytic cracking catalyst having a high resistivity to metals (Japanese Patent Application Open-Gazette No. 59-150539). This catalyst can be manufactured by mixing alumina-magnesia hydrogel and zeolite, and then drying and calcining the mixture. The catalyst thus prepared is highly resistive to metals and can be suitably used for catalytically cracking a residual oil.

However, with this catalyst containing alumina-magnesia as a matrix, there is a tendency to inhibit the removal of aluminum from zeolite under a hydrothermal conditions, and in some cases it is difficult to obtain a product having an sufficient octane number for FCC (Fluid Catalytic Cracking Process) gasoline.

When an FCC catalyst is charged into FCC apparatus, the removal of aluminum from zeolite generally takes place in a regeneration column heated to a high temperature, thereby lowering the crystal lattice constant of the zeolite. As is generally recognized, there is an intimate correlation between the crystal lattice constant of the zeolite in the FCC catalyst and the octane number of gasoline thus produced. Namely, the smaller the crystal lattice constant of the zeolite, the higher the octane number of FCC gasoline is also much influenced by the nature of feed stock as well as by the operation conditions of an FCC apparatus.

Accordingly, even if a catalyst comprising alumina-magnesia as a matrix is employed, a gasoline having a desired octane number can be produced if a feed stock of high aromatic content is employed, or the cracking operation is conducted at a relatively high temperature. On the contrary, if a feed stock of high saturation is employed, or if the cracking operation is conducted at a relatively low temperature, a gasoline having an undesirable octane number may be produced.

SUMMARY OF THE INVENTION

The present invention has been accomplished in view of above facts, and therefore the object of the present invention is to provide a method of manufacturing a catalyst which is suited for use in the conversion reaction of a hydrocarbon oil.

More particularly, the object of the present invention is to provide a catalytic cracking catalyst which has a high resistivity to metals, and is suited for use in cracking a heavy oil containing 0.5 ppm or more of heavy metals such as nickel, vanadium and iron, giving a high yield of gasoline having a high octane number, and at the same time inhibiting the formulation of hydrogen and coke.

Namely, according to the present invention, there is provided a method of manufacturing a hydrocarbon conversion catalyst by spray-drying a slurry containing alumina-magnesia and a crystalline aluminosilicate zeolite, which is characterized in that said alumina-magnesia is treated with a phosphorus-containing solution before or after said slurry is subjected to a spray-drying treatment.

DETAILED DESCRIPTION OF THE PREFERRED EMBODIMENTS

Alumina-magnesia which is suited for use in the present invention is natural or synthesized alumina-magnesia, or its precursor, i.e. a material containing as a main component alumina and magnesia, and exhibiting an X-ray diffraction pattern inherent to alumina-magnesia spinel, or its precursor.

It is preferable to use an alumina-magnesia containing 10 to 60% by weight, more preferably 20 to 50% by weight of magnesia. If the content of magnesia in the alumina-magnesia is less than 10% by weight, the resistivity of the catalyst to metals is undesirably lowered. On the contrary, if the content of magnesia in the alumina-magnesia is more than 60% by weight, the presence of magnesia badly affects the zeolite to a great extent.

The above mentioned alumina-magnesia can be prepared by the following process.

First, alumina-magnesia spinel can be prepared by mixing aluminum oxide or hydroxide power and magnesium oxide or hydroxide powder, and then calcining the resultant mixture. The calcination temperature in this case should be 800° C. or more. More specifically, calcination temperature of 800° C. to 2100° C., preferably 1000° C. to 1900° C. may be employed. It is also possible to prepare alumina-magnesia spinel by impregnating alumina powder with an aqueous solution of magnesium, and then drying and calcining the resultant product. However, this latter method is not preferable, since it would be very difficult in this case to prepare alumina-magnesia spinel containing 10% by weight or more of magnesia. Likewise, a method of preparing alumina-magnesia spinel by impregnating magnesia powder with an aqueous solution of aluminum, and then drying and calcining the resultant product is also not preferable, since it would be very difficult in this case to prepare alumina-magnesia spinel containing less than 60% by weight of magnesia.

In view of abrasion resistance and metal resistance of the catalyst, the grain size of the alumina-magnesia spinel should be as small as possible. To be more specific, the average grain diameter of the alumina-magnesia spinel should be 30 $\mu m$ or less, more preferably 5 $\mu m$ or less.

It should be noted that alumina-magnesia as defined in the present invention includes alumina-magnesia hydrogel, which can be manufactured by a precipitation method. The alumina-magnesia hydrogel is a precursor of alumina-magnesia spinel, and can be converted into alumina-magnesia spinel by drying and calcining. This precipitation method is commonly employed in the manufacture of alumina-magnesia hydrogel. According to this precipitation method, an aqueous solution containing both aluminum salt and magnesium salt is reacted with an aqueous solution of a basic compound at a pH value ranging from 8 to 11, preferably from 8 to 10 to obtain the alumina-magnesia hydrogel.

Examples of the basic compound are ammonia, sodium hydroxide and potassium hydroxide. As the aluminum salt and magnesium salt, salts of mineral acids such as sulfate, nitrate and chloride can be preferably employed.

When the alumina-magnesia hydrogel is dried, a mixture of alumina hydrate and magnesia hydrate, a mixture of alumina hydrate and hydrotalcite, or a mixture of alumina hydrate, magnesia hydrate and hydrotalcite can be obtained. These mixtures are also precursors of the alumina-magnesia hydrogel. Examples of alumina hydrate include amorphous alumina hydrate, gypsite, boehmite, psuedo-boehmite, bialite, northlandite and diaspore. Examples of magnesia hydrate include amorphous magnesia hydrate and magnesium hydroxide. Hydrotalcite as defined herein includes not only a carbonate type, but also all of substitution types similar to the carbonate type, such as sulfate type, nitrate type and chloride type.

The crystalline aluminosilicate zeolite to be used as a dispersion in a matrix according to the present invention is natural or synthetic crystalline aluminosilicate having a three-dimensional structure which is made up of a porous structure having a uniform pore size ranging from about 0.4 to 1.5 nm.

Examples of natural zeolite include gmelinite, chabazite, dachiardite, clinoptilolite, faujasite, stilbite, analcime, levynite, erionite, sodalite, cancrinite, ferrierite, brewsterite, offretite, soda mesotype and mordenite. Among them, faujasite is most preferable. Examples of synthetic zeolite include zeolite X, Y, A, L, ZK-4, B, E, F, HJ, M, Q, T, W, Z, alfa, beta and ZSM type omega. Among them, Y type and X type zeolites or a mixture of them are more preferable. Most preferable example is ultra-stable Y type (USY) zeolite having a lattice constant ranging from 2,425 to 2,460 nm, which can be obtained by subjecting the Y type zeolite to dealuminization.

Na ions or protons in the zeolite can be substituted by other cations. For example, when Na ions or protons in the zeolite are ion-exchanged with monovalent lithium or polyvalent cations, the hydrothermal stability of zeolite can be enhanced. Examples of such cations are $Li^+$, $Ca^{2+}$, $Mg^{2+}$, $Fe^{2+}$, $Fe^{3+}$, $Mn^{2+}$, or rare earth element ions such as Ce, La, Nd, Sm and Pr.

According to this invention, the alumina-magnesia is treated with phosphorus-containing solution before or after the alumina-magnesia is mixed with crystalline aluminosilicate zeolite and subjected to a spray-drying treatment. Examples of the phosphorus-containing solution to be used in this case include an aqueous solution of phosphoric acid, an aqueous mixed solution of phosphoric acid and ammonia, an aqueous solution of ammonium phosphate, an aqueous solution of ammonium dihydrogen phosphate and an aqueous solution of ammonium hydrogen phosphate. The concentration of phosphorus in the phosphorus-containing solution may preferably be 0.01 to 5.0% by weight, more preferably 0.05 to 1.0% by weight.

When alumina-magnesia spinel is employed as an alumina-magnesia and is treated with the phosphorus-containing solution prior to the spray-drying treatment, the pH value of the phosphorus-containing solution should preferably be adjusted to the range of 1 to 4, more preferably 2 to 3.5 by using for example ammonia. The amount of the phosphorus-containing solution may be in the range of 10 to 1000 parts by weight, more preferably 50 to 500 parts by weight per 100 parts by weight of the alumina-magnesia spinel.

On the other hand, if the alumina-magnesia spinel is treated with the phosphorus-containing solution subsequent to the step of the spray-drying treatment, only the pH value of the phosphorus-containing solution should be adjusted to the range of 1 to 11.

When a precursor of alumina-magnesia spinel, such as alumina-magnesia hydrogel is employed as an alumina-magnesia, and is treated with the phosphorus-containing solution before or after the step of spray-drying treatment, the pH value of the phosphorus containing solution should preferably be adjusted to the range of 7 to 11, more preferably 8 to 10 by using for example ammonia. The amount of the phosphorus-containing solution may be in the range of 100 to 50000 parts by weight, more preferably 300 to 20000 parts by weight per 100 parts by weight of the precursor of alumina-magnesia spinel.

In order to produce spherical micrograins by spray-drying a slurry containing alumina-magnesia and crystalline aluminosilicate zeolite, a binder may be added to the slurry. When alumina-magnesia spinel is employed as an alumina-magnesia, a binder, which is commonly employed for a catalytic cracking of hydrocarbon, is preferably employed. Examples of this type of catalyst is alumina- or silica-based sol-type binder. Silica sol type binder may be prepared by neutralizing water glass with a mineral acid such as sulfuric acid. In this case, the pH value thereof should be controlled to 1 to 4. These binders are stable under acidic conditions (4 or less in pH). However, when these binders are exposed to a basic condition, they are immediately turned into a gel thereby degrading the capacity of the binder.

When alumina-magnesia spinel is suspended in water, a portion of magnesia is dissolved out of the spinel thereby making the emulsion basic. Accordingly, when the alumina-magnesia spinel is employed as it is without giving any treatment thereto in the preparation of the catalyst, the binder is more likely turned into a gel thereby degrading the abrasion resistance of the catalyst. Further, the dissolved magnesia will be adsorbed on an acid site of zeolite, so that the dealuminization from zeolite under a hydrothermal condition will be inhibited.

Accordingly, when the catalyst is employed as a catalytic cracking catalyst for cracking hydrocarbon, the octane number of gasoline to be produced will be badly affected. On the contrary, when alumina-magnesia spinel is treated with a phosphorus-containing solution, the magnesia in the spinel is immobilized, thus making it possible to avoid the above problems.

When a precursor of alumina-magnesia spinel such as alumina-magnesia hydrogel is employed as an alumina-magnesia, there is no need for employing any binder, as the precursor itself is furnished with a capacity of binder. However, a binder may be employed for enhancing the capability of the catalyst for cracking a residual oil. In this case, a stabilized silica sol, which would not be gelled even under a basic condition, may preferably be employed.

The treatment with a phosphorus-containing solution is highly effective in inhibiting magnesia from being adsorbed on the zeolite, as well as in removing the magnesia adsorbed on the zeolite, thereby improving the octane number of gasoline to be produced.

A clay may be added to the catalyst of the present invention. The clay to be employed may be selected from those commonly employed in the conventional catalytic cracking catalyst. Examples of such a clay include kaolin, bentonite, montmorillonite and halloisite.

The composition of the catalyst may comprise 10 to 40 wt. % of crystalline aluminosilicate zeolite and 60 to 90 wt. % of alumina-magnesia in the case of the combination of crystalline aluminosilicate zeolite and alumina-magnesia; 10 to 40 wt. % of crystalline aluminosilicate zeolite, 10 to 85 wt. % of alumina-magnesia and 5 to 50 wt. % of a binder in the case of the combination of crystalline aluminosilicate zeolite, alumina-magnesia and a silica- or alumina-based binder; 10 to 40 wt. % of crystalline aluminosilicate zeolite, 10 to 85 wt. % of alumina-magnesia and 5 to 50 wt. % of a clay in the case of the combination of crystalline aluminosilicate zeolite, alumina-magnesia and clay; and 10 to 40 wt. % of crystalline aluminosilicate zeolite, 5 to 50 wt. % of alumina-magnesia, 5 to 50 wt. % of a clay and 5 to 50 wt. % of a binder in the case of the combination of crystalline aluminosilicate zeolite, alumina-magnesia, clay and a silica- or alumina-based binder. In these compositions, the content of magnesia in the alumina-magnesia should range from 10 to 60 wt. %.

The catalyst to be produced according to the present invention preferably has a bulk density ranging from 0.5 to 0.8 g/cc, an average grain diameter ranging from 50 to 80 $\mu$m, a surface area ranging from 100 to 400 m$^2$/g, and a pore volume ranging from 0.05 to 0.5 cc/g.

When a catalyst produced by the method of the present invention is employed for catalytically cracking a heavy oil, heavy metals such as nickel and vanadium contained in the heavy oil are immobilized on the catalyst and as a result inactivated. Therefore, increases in yield of hydrogen and coke due to the metals deposited on the catalyst are inhibited, and the lowering of activity of the catalyst can be avoided, so that the selectivity and yield of desirable liquid products can be increased. Further it is possible to reduce the load of a gas compressor, which is one of distillation equipments for a cracked product, or the load of an air blower for supplying air for burning coke deposited on a catalyst.

Although the reason for the immobilization and inactivation of heavy metals deposited on the catalyst of the present invention is not yet clear these phenomena may be explained as follows. Namely, nickel adhered on the catalyst of the present invention in a reaction column is turned into nickel oxide in a regeneration column, and the nickel oxide thus formed is capable of easily intruding into alumina-magnesia spinel, or substituting the components of alumina-magnesia spinel and is solid-solubilized therein, since the ionic radius of nickel oxide in this case is almost the same as that of magnesium. The nickel oxide thus solid-solubilized is rather stable so that the nickel oxide is not reduced again in a reaction column, and therefore, the dehydrogenation activity of nickel is vanished, so that the formation of hydrogen and coke can be inhibited.

Likewise, vanadium is also oxidized in a regeneration column to produce vanadium pentoxide. Since the melting point of the vanadium pentoxide is 674° C. or relatively low, it is considered that the vanadium pentaoxide moves over the catalyst in the regeneration column and reacts with zeolite, thereby destroying the crystal structure of the zeolite, thus lowering its catalytic activity. However, the vanadium pentoxide adhered on the alumina-magnesia spinel reacts with alumina or magnesia thus produce a stable oxide composite ($3MgO \cdot V_2O_5$) having a high melting point, and as a result is immobilized.

According to this invention, it has become possible to produce a hydrocarbon conversion catalyst which exhibits an excellent effect as a fluid catalytic cracking catalyst to be used in a process of catalytically cracking a heavy oil containing 0.5 ppm or more in total for obtaining light oils such as gasoline and kerosene.

PREFERRED EMBODIMENT OF THE INVENTION

The present invention will be further illustrated by the following examples.

EXAMPLE 1

(A) Alumina-magnesia spinel was prepared by the following process.

283 g of magnesia powder and 717 g of alumina powder were mixed together, and the resultant mixture was calcined in air at a temperature of 1800° C. The calcined powder was examined through the X-ray diffraction pattern to find out that the X-ray diffraction pattern of the calcined powder was identical to that of alumina-magnesia spinel. The average grain diameter of the calcined powder was 15 $\mu$m.

200 g of this alumina-magnesia spinel powder was introduced into 200 cc of 1 wt. % aqueous solution of phosphoric acid whose pH value was adjusted to 2.5 with ammonia, and the resultant mixture was agitated for 30 minutes.

(B) Silica sol was prepared by the following process.

2155 g of a diluted solution of JIS No. 3 water glass (the concentration of SiO$_2$: 11.6%) was dripped into 337 g of 40% sulfuric acid to obtain a silica sol having a pH value of 2.4. This silica sol was then aged at the room temperature for 40 minutes.

(C) USY type zeolite was prepared by the following process.

1 kg of Na-Y type zeolite and 2.5 kg of ammonium chloride were charged into a 60 l vessel, and then pure water was added to the vessel in such an amount that the total volume of the content in the vessel became 50 l of pure water. After repeating the above treatments twice, the filter cake was dried, and subjected to a steam treatment at a temperature of 750° C. for 3 hours. Finally, the above ion exchange treatment was repeated once more, and then the resultant filter cake was dried and washed. The zeolite thus obtained was found to have a crystal lattice constant of 2.450 nm by examining its X-ray diffraction in accordance with the method of ASTM D-3942-80.

Then, 200 g of alumina-magnesia spinel prepared in the process (A) was added together with the phosphoric acid solution to the entire volume of silica sol prepared by the process (B). To this mixture were further added 350 g of zeolite in the process (C) and 200 g of kaolin, and the entire mixture was kneaded. Then, the resultant mixture was spray-dried by using hot air of 250° C. The resultant spray-dried product was washed with 5 l of 0.2% ammonium sulfate at a temperature of 50° C., and then dried in an oven at a temperature of 110° C. thereby obtaining a catalyst A. Features of this catalyst A are shown in Table 1.

An abrasion test on this catalyst was conducted as follows.

Namely, a prescribed amount of the catalyst was fluidized in a constant air flow velocity. In this case, a portion of the catalyst was crushed to scatter outward. Accordingly, the ratio of the amount of this crushed catalyst was designated as abrasion index.

The activity and selectivity of the catalyst A were evaluated in accordance with ASTM D-3907 MAT (Micro-Activity-Test). Further, in order to determine the metal resistance of the catalyst A, 0.3 wt % of nickel and 0.6 wt % of vanadium were adsorbed on the catalyst A in accordance with the method of Mitchell (Ind. Eng. Chem. Prod. Res. Dev., 19, 209 (1980)). To be more specific, the catalyst A was impregnated in a toluene solution of nickel naphthenate and vanadium naphtenate, and then the solvent was evaporated.

Then, the catalyst was calcined at a temperature of 550° C. for 3 hours. Further, in order to make the capacity of the catalyst A equivalent to that of the equilibrium catalyst, the catalyst A was subjected to a steaming treatment at a temperature of 770° C. for 6 hours prior to offering the catalyst A to the MAT. The reaction conditions in MAT was 40 in WHSV(Weight Hourly Space Velocity), 3 in catalyst/oil ratio, and 515° C. in reaction temperature.

The feed stock was a mixed oil substantially consisting of 50% of desulfurized residual oil and 50% of desulfurized VGO, and containing 4 wt % of residual carbon content. The results of MAT are shown in Table 1. The conversion ratio (CR) was calculated as follows.

$$CR = [(\text{Feed stock-Distillates having a b.p. of } 221° \text{ C.}$$
$$\text{in the produced oil})/\text{Feed stock}] \times 100 \text{ (wt \%)}$$

The composition of gasoline obtained MAT was analyzed by means of a gas chromatography, and the results thereof were utilized for determining the octane number of the gasoline. The results thereof are also shown as DC octane number in Table 1.

COMPARATIVE EXAMPLE 1

1 kg of alumina powder was calcined in air at a temperature of 1800° C. to obtain α-alumina. 200 g of this α-alumina was subjected to the phosphonic acid treatment in the same manner as illustrated in (A) of Example 1. Thereafter, the same procedures were repeated using this α-alumina as described in Example 1 to obtain a catalyst B.

The composition of the catalyst B, the abrasion index of the catalyst B and the results of MAT are shown in Table 1.

COMPARATIVE EXAMPLE 2

200 g of alumina-magnesia spinel prepared in (A) of Example 1 was dispersed in 200 cc of pure water, and then agitated for 30 minutes. The same procedures as those illustrated in Example 1 were repeated except that the alumina-magnesia spinel was not treated with the phosphoric acid-containing solution in this case, thereby obtaining a catalyst C. The silica sol in this example was turned into a gel.

The composition of the catalyst C, the abrasion index of the catalyst C and the results of MAT are shown in Table 1.

EXAMPLE 2

597 g of sodium aluminate and 18 cc of a 50% aqueous solution of gluconic acid were dissolved into 5 l of pure water, and then the resultant mixture was heated to 50° C. On the other hand, 650 g of magnesium sulfate and 1350 cc of 2N sulfuric acid were dissolved into 4 l of pure water, and then the resultant mixture was heated to 50° C. These two solutions were dripped into a 20 l vessel thereby producing alumina-magnesia hydrogel. In this case, the pH of the reaction mixture was adjusted to 10 by controlling the flow rate of these two solutions. The resultant hydrogel was aged at a temperature of 50° C. for 2 hours. The hydrogel thus aged was filtered and washed with pure water amounting 100 times as much as that of the hydrogel.

Then, 976 g of a stabilized silica sol (available as SI-550 (trademark) from Shokubai Kasei Kogyo Co., Ltd., Japan, $SiO_2$ concentration: 20.5 wt %), 125 g of kaolin and 300 g of zeolite prepared in the process (C) were added to the entire volume of silica gel prepared above, and kneaded together. Then, the resultant mixture was spray-dried by using a hot air of 250° C. The resultant spray-dried product was washed with 5 l of 1% ammonium bicarbonate at a temperature of 50° C. The resultant product was further washed with 5 l of a 1% aqueous solution of phosphoric acid after the pH was adjusted to 9.5 by using ammonia, and then dried in an oven at a temperature of 110° C. thereby obtaining a catalyst D.

Features of this catalyst D are shown in Table 1.

TABLE 1

| | Catalyst | A | B | C | D |
|---|---|---|---|---|---|
| Components of catalyst | Alumina-magnesia wt % | 20 (28.3) | | 20 (28.3) | 20 (28.3) |
| | alpha-alumina wt % | | 20 | | |
| | Kaolin wt % | 20 | 20 | 20 | 12.5 |
| | Amorphous silica wt % | 25 | 25 | 25 | 20 |
| | Zeolite wt % | 35 | 35 | 35 | 30 |
| Results of MAT | Conversion ratio wt % | 70.3 | 67.1 | 71.2 | 70.8 |
| | Yield of | 50.2 | 43.5 | 50.8 | 50.5 |

TABLE 1-continued

| Catalyst | A | B | C | D |
|---|---|---|---|---|
| gasoline wt % | | | | |
| Yield of coke wt % | 5.7 | 7.7 | 5.5 | 6.0 |
| Yield of dry gas wt % | 212 | 331 | 205 | 220 |
| GC octane number | 91.0 | 91.2 | 89.9 | 90.5 |
| Abrasion index | 2 | 2 | 13 | 3 |

*:The values in the parenthesis denote the content (wt. %) of magnesia in the alumina-magnesia.

As evident from these results, the catalyst B, which contains none of alumina-magnesia, gives high yields of dry gas and coke, and is poor in the metal resistance as compared with the catalyst A. On the other hand, the catalyst C comprising alumina-magnesia, which is not treated with the phosphoric acid solution, is inferior in abrasion resistance due to the gelation of the silica sol, and is somewhat low in the octane number of gasoline. Meanwhile, the catalyst D indicated almost the same excellent results as those of the catalyst A.

What is claimed is:

1. A method of manufacturing a hydrocarbon conversion catalyst which consists of preparing alumina-magnesia, treating said alumina-magnesia with a solution containing a phosphorus compound, mixing said alumina-magnesia treated with said phosphorus containing compound with a crystalline alumina silicate zeolite to obtain a slurry and subjecting said slurry to spray-drying.

2. The method according to claim 1 wherein said alumina-magnesia contains 10-60% by weight of magnesia.

3. The method according to claim 2 wherein said alumina-magnesia exhibits the X-ray diffraction pattern inherent to alumina-spinel and is prepared by mixing aluminum oxide or hydroxide and magnesium oxide or hydroxide followed by calcination at a temperature of 800° C.-2100° C.

4. The method according to claim 3 wherein said alumina-magnesia spinel has a grain diameter at the most of 30 um.

5. The method according to claim 3 wherein said alumina-magnesia spinel is prepared from an alumina-magnesia hydrogel by drying followed by calcination.

6. The method according to claim 3 wherein said aluminosilicate zeolite has a pore size of 0.4-1.5 um.

7. The method according to claim 3 wherein the content of phosphorus in said phosphorus containing solution is 0.01-5% by weight.

8. The method accpording to claim 7 wherein the pH of said phosphorus containing solution is adjusted to 1-4.

9. The method according to claim 1 wherein said manufactured catalyst has a bulk density of 0.5 to 0.8 g/cc, an average grain diameter of 50 to 80 um, a surface area of 100 to 400 m$^2$/g, and a pore volume of 0.05 to 0.5 cc/g.

10. The method according to claim 1 wherein a silica sol binder is added to said slurry prior to spray drying.

11. The method according to claim 1 wherein said spray drying is carried out with hot air at 250° C.

12. A method of manufacturing a hydrocarbon conversion catalyst which consists of preparing alumina-magnesia, mixing said alumina-magnesia with crystalline alumina silicate zeolite, spray drying said mixture and treating the spray-dried mixture with a solution of a phosphorus-containing compound.

13. The method according to claim 11 wherein said alumina-magnesia is a hydrogel, and the pH of said solution of said phosphorus-containing compound is adjusted to 7-11.

* * * * *